United States Patent [19]

Lukowski, Jr. et al.

[11] Patent Number: 4,678,329
[45] Date of Patent: Jul. 7, 1987

[54] AUTOMATICALLY GUIDED VEHICLE CONTROL SYSTEM

[75] Inventors: Frank J. Lukowski, Jr., Alden; Harry B. Hammill, III, Williamsville, both of N.Y.

[73] Assignee: Calspan Corporation, Buffalo, N.Y.

[21] Appl. No.: 789,280

[22] Filed: Oct. 18, 1985

[51] Int. Cl.⁴ ............................................. G01B 11/26
[52] U.S. Cl. .................................. 356/152; 356/138; 356/141
[58] Field of Search ............... 356/152, 138, 400, 141; 244/171; 250/214 B; 358/95

[56] References Cited

U.S. PATENT DOCUMENTS

| | | | |
|---|---|---|---|
| Re. 29,025 | 11/1976 | Hansen | 356/138 |
| 3,119,501 | 1/1964 | Lemelson | 214/16.4 |
| 3,824,020 | 7/1974 | Pease | 356/152 |
| 3,887,282 | 6/1975 | Hansen | 356/138 |
| 4,053,233 | 10/1977 | Bien et al. | 356/152 X |
| 4,122,957 | 10/1978 | Allen et al. | 214/16.4 A |
| 4,218,616 | 8/1980 | Loomer | 356/152 X |
| 4,219,847 | 8/1980 | Pinkney et al. | 358/126 |
| 4,259,952 | 3/1981 | Früngel et al. | 356/5 X |
| 4,311,382 | 1/1982 | Buckley et al. | 356/152 X |
| 4,331,417 | 5/1982 | Shearer, Jr. | 414/273 |
| 4,397,549 | 8/1983 | Morgan | 356/5 |
| 4,413,907 | 11/1983 | Lane | 356/141 |
| 4,470,664 | 9/1984 | Shirasawa | 356/5 X |
| 4,531,078 | 7/1985 | Canter et al. | 250/214 B X |

OTHER PUBLICATIONS

An article entitled "Robot Guidance Using Computer Vision" by J. W. Courtney and J. K. Aggarwai, Laboratory for Image and Signal Analysis and Department of Electrical Engineering, The University of Texas at Austin, Austin, Texas 78712, 1983 IEEE.

Primary Examiner—Stephen C. Buczinski
Assistant Examiner—Linda J. Wallace
Attorney, Agent, or Firm—Biebel, French & Nauman

[57] ABSTRACT

A target member mounted on a stationary object, such as a pallet, includes at least three reflector elements. An identifying means, such as a high intensity light source, and an imaging sensor are carried by another, movable object, such as a forklift truck. The reflector elements are so configured as to form images of the identifying means with said images defining a plane oriented other than normal to align from the identifying means to that plane, the images also defining a circle that does not include the identifying means. The target member may be in the form of a vertically oriented planar support member on which are mounted a pair of convex mirrors and a concave mirror. The images of the identifying means in the mirrors are detected by an imaging sensor, such as a television camera, and the directions of each of the images at the camera are used to determine all six degrees of positional information of the sensor with respect to the target. That information may be used to guide the forklift truck into position relative to a pallet. The target support member includes retroreflector elements to aid in locating a pallet. Circuit means are provided to flash the light source and in response to the light returned by the retroreflectors to define an area on the image plane of the camera where reflections from the mirrors may be found. Ambient light images are then temporarily recorded, the light source again flashed, and the ambient images are electronically removed so that only those images due to reflections in the mirrors are finally recorded.

5 Claims, 24 Drawing Figures

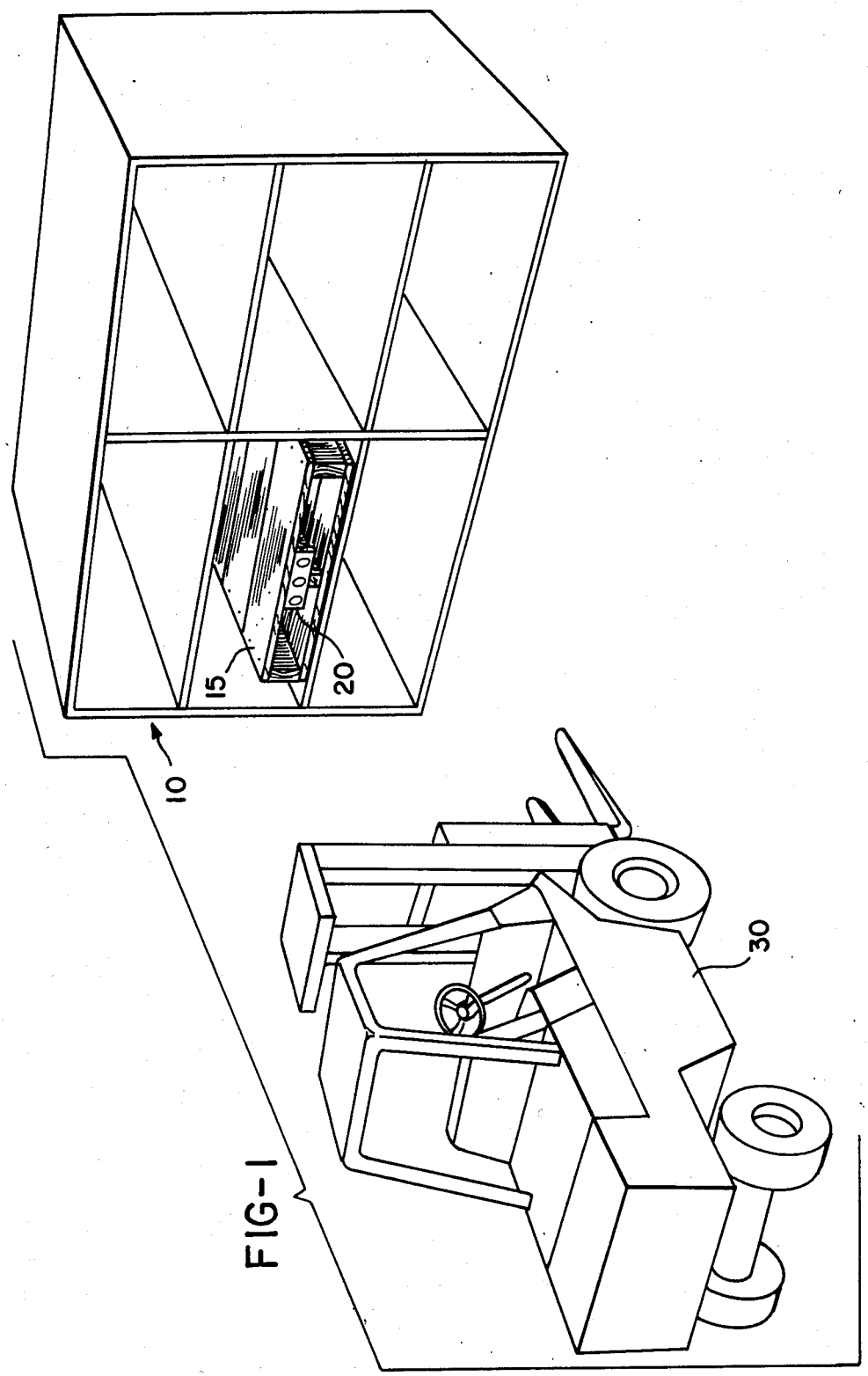

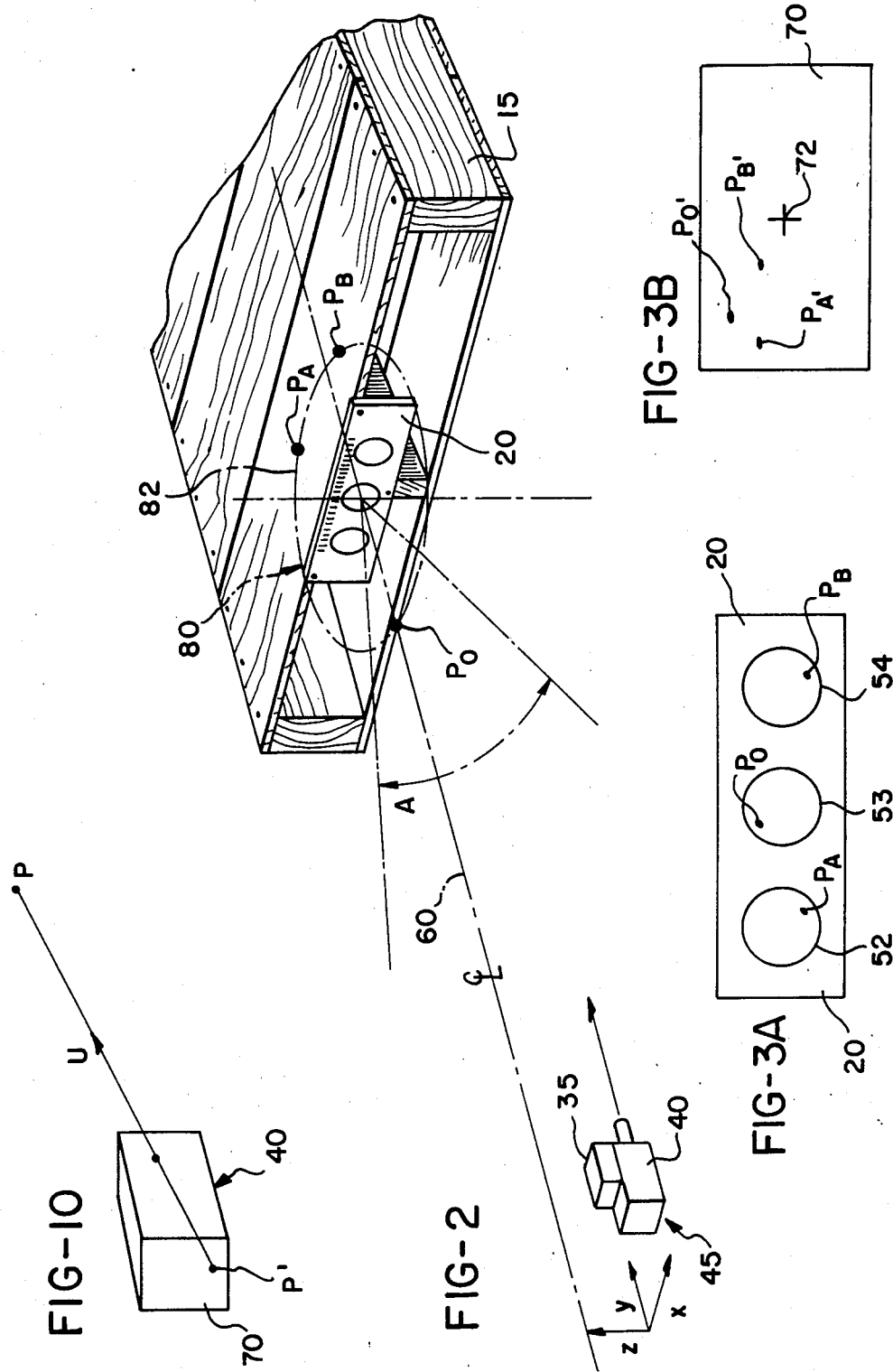

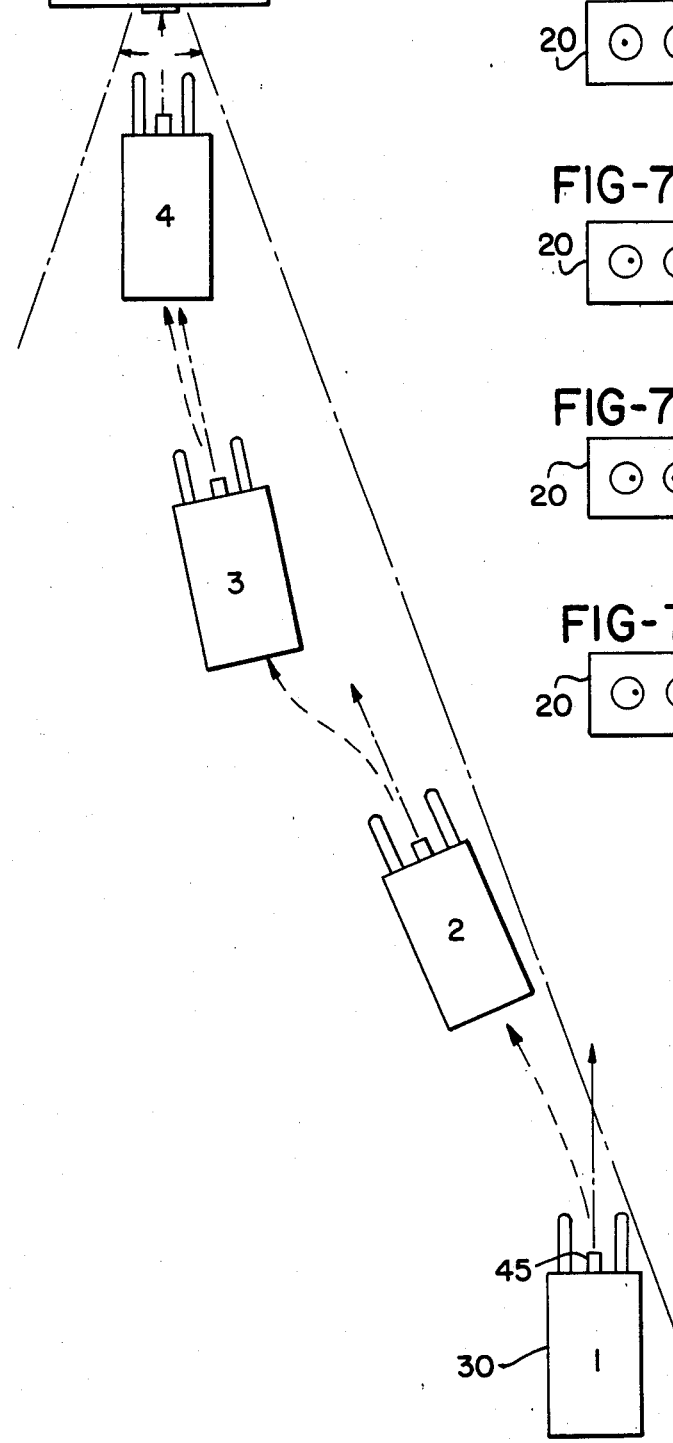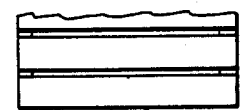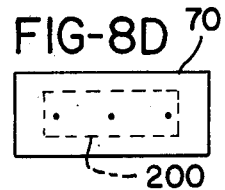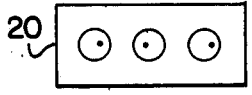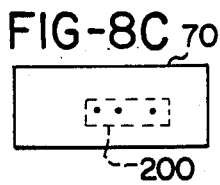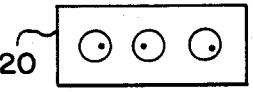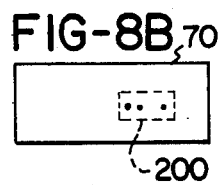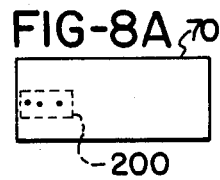

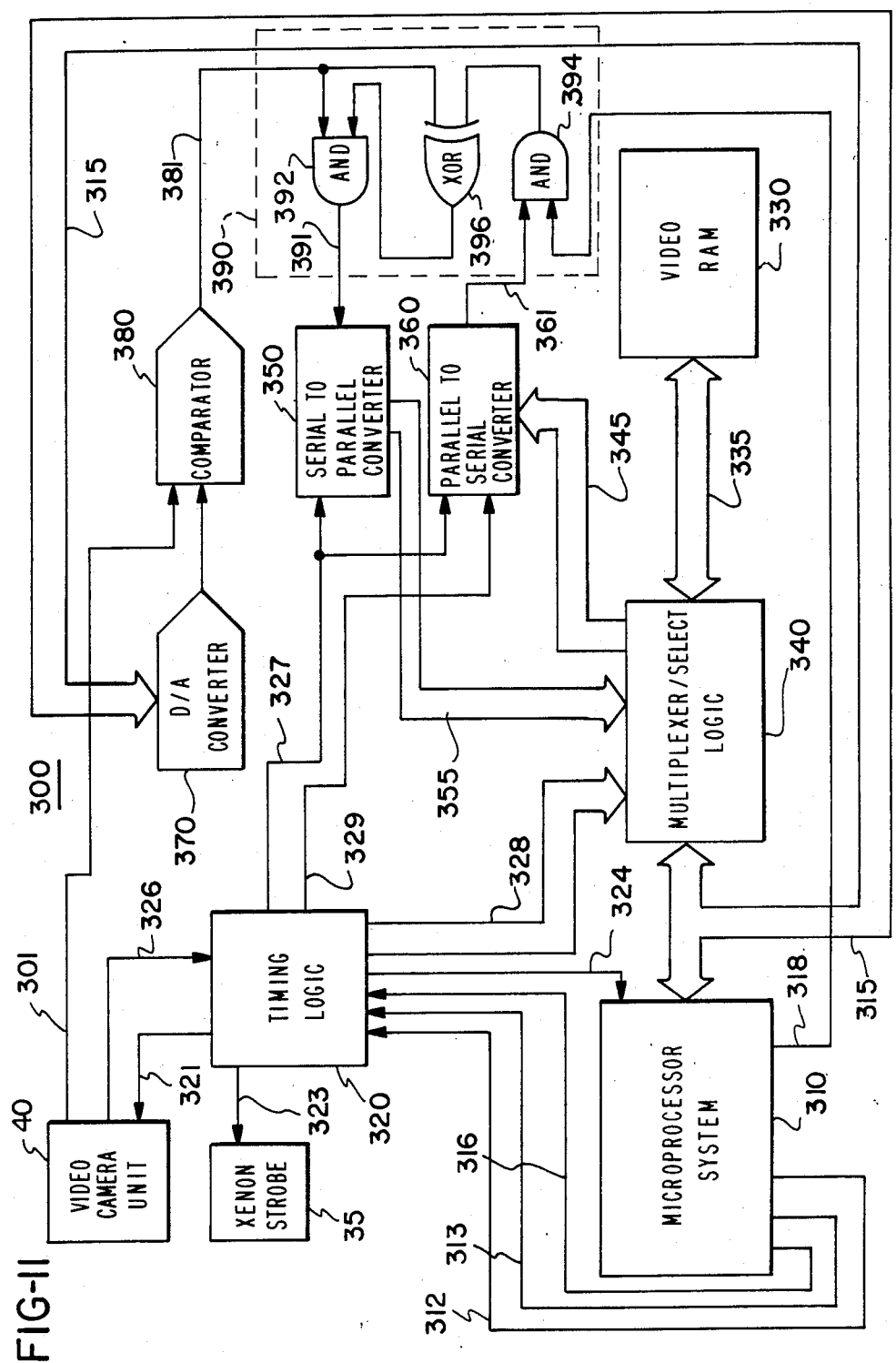

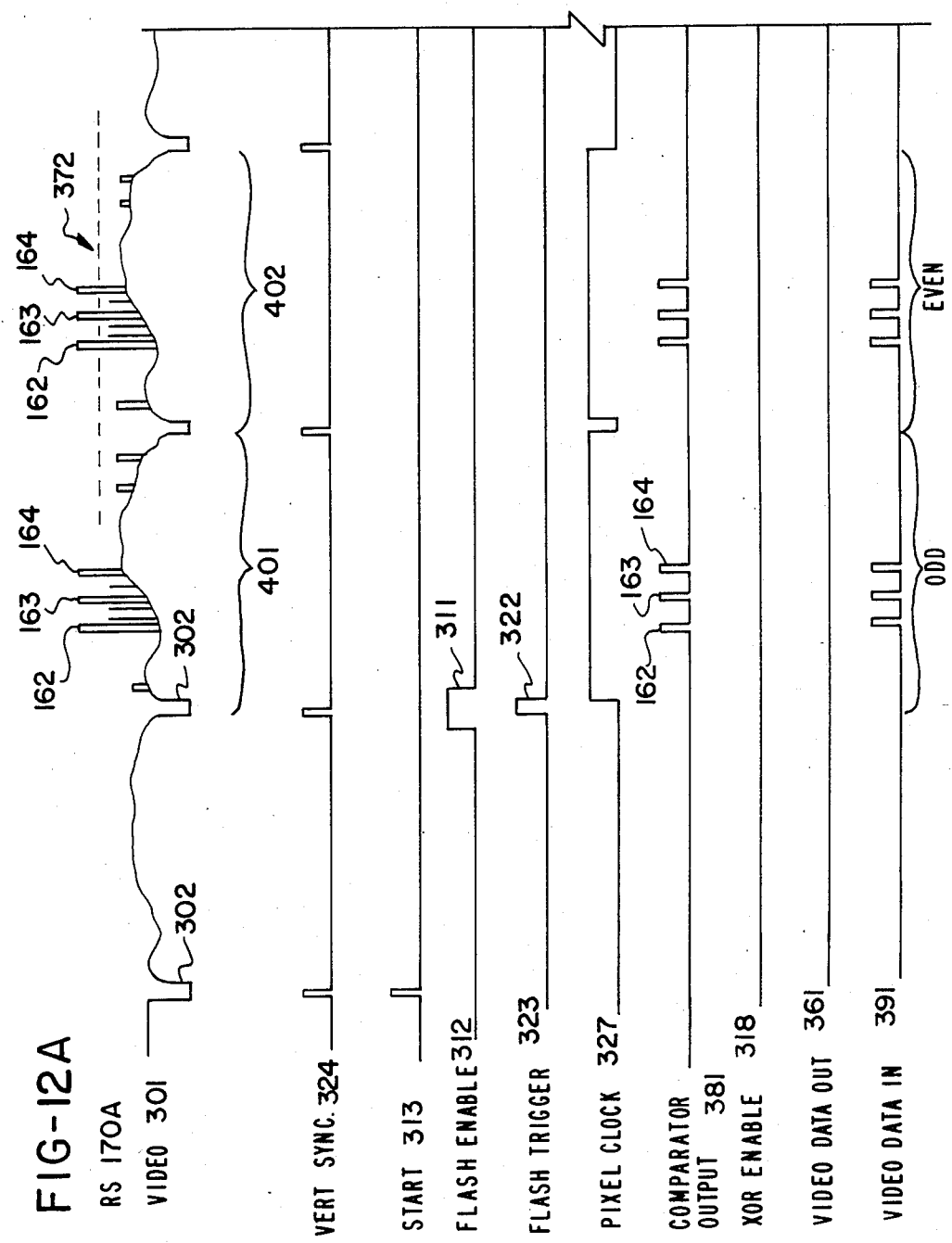

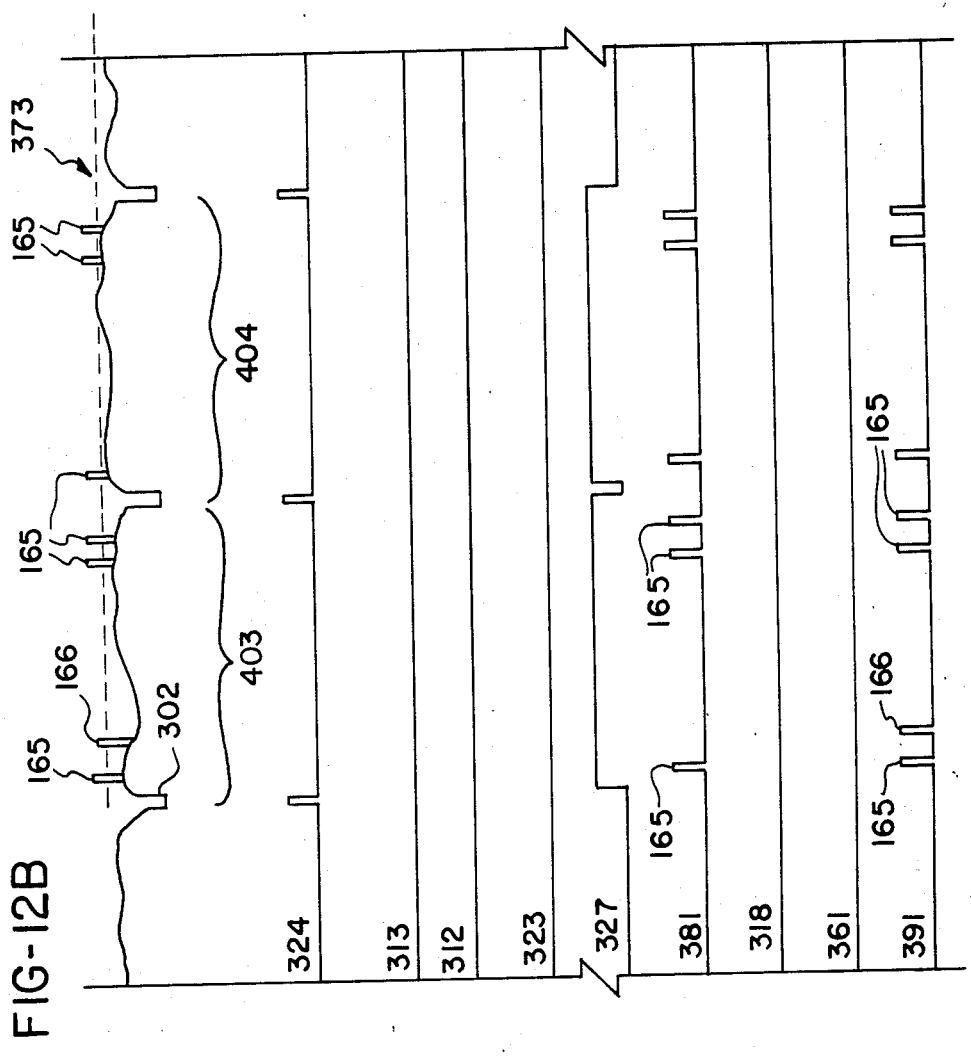

AUTOMATICALLY GUIDED VEHICLE CONTROL SYSTEM

BACKGROUND OF THE INVENTION

This invention relates to method and apparatus for determining the position and orientation of a target with respect to a sensor. Both the target and the sensing unit may be affixed to movable objects, although generally the target will be stationary, and the sensing unit will be attached to a self-propelled vehicle.

There are many prior art devices which attempt to determine the location of a vehicle with respect to a target. In these devices, the vehicle carries a sensing unit, the output of which controls some function of the vehicle, such as its forward motion, steering control or the vertical location of the forks. The target might be the pallet itself or the frame or rack on which the pallet is supported. Some of the prior art devices employ specialized marks whose dimensions are known; others utilize special light projectors and sense the light reflected from the target for positioning a vehicle, or a component of the vehicle, such as the forks of a lift truck.

When using a plurality of marks located on the target, it is difficult, and becomes close to impossible, to determine accurately all six degrees of freedom, that is, horizontal position—right and left, horizontal position—forward and back, vertical position, roll, pitch and yaw. These prior art systems do not give adequate positional information, especially when the vehicle is positioned directly in front of the target, to guide the vehicle accurately.

SUMMARY OF THE INVENTION

This invention is directed to a target member for use in a positioning system for providing at least three identifiable images positioned with respect to a sensor carried by a self-propelled vehicle. These three images are located so as to provide an unambiguous frame of reference thereby to allow the determination of all six positional and orientational degrees of freedom from a single observation of the target by the sensor.

By translating or rotating the plane of the images from what has traditionally been normal viewing by the sensor to a plane which is essentially parallel to a line from the sensor to the target, positional ambiguities are resolved and accurate information regarding the relative location of the vehicle to the target is obtainable, even when the vehicle is located directly in front of the target.

In one embodiment of the invention, the target includes at least three reflector elements mounted on a support member. The target and the reflector elements provide a thin, essentially flat surface while at the same time providing to the vehicle mounted sensor the appearance of a target having considerable depth. The mirrors are selected so that the images of a light source carried by the vehicle define a plane and a circle. The plane is not normal to the sensor viewing axis, and the circle does not include the sensor. A light source was chosen as the identifying means so that it could be readily detected by commercially available sensing devices, such as a small television camera.

Preferably, the reflector elements have at least two different radii of curvature. For example, two of the reflectors may be convex and have the same radius of curvature, and the third reflector may be concave. The radius of curvature and diameter of each are selected so that the reflection of the light source may be viewed by a sensor when the vehicle is within a predetermined field of view with respect to the target. It is necessary, of course, to allow the vehicle to approach the target from some distance, and to identify the location of the target from some acceptable viewing angle.

The target member may also include retroreflector members which provide a brilliant and rather large reflection whenever the light source is flashed. The position of the reflections from the retroreflector members are used to determine the area on the sensor's image plane where the desired reflections of the light source from the curved reflector elements are to be found.

The target member may also include coded means for identifying the specific target, such as a bar code that may be scanned to confirm that the target within the field of view of the sensor is the one to be engaged by the vehicle.

Since the geometry of the reflector elements is known, the positions of the reflections on the image plane of the camera will provide the information necessary to determine accurately the relative location of the camera, and vehicle on which it is carried. Armed with this information, a guidance system may be programmed to maneuver the vehicle into proper position with respect to the target.

In the preferred embodiment, the identifying means is a light source, and specifically a xenon strobe lamp for providing a short duration, high intensity pulse of light directed away from the front of the vehicle along the axis of the camera and back to the sensor via the mirrors. Ideally, the camera and the light source would be collocated. It is possible to use half silvered mirrors so that the center of the light source falls upon the axis of the lens of the camera. However, a practical embodiment of the invention places the light source immediately above the camera. It has been found that this slight offsetting does not appreciably affect the accuracy of the measurements taken.

It is, therefore, an object of this invention to provide a target member for use in a positioning system that employs at least three reflector elements with each of the reflector elements being so configured to form images of an identifying means in a plane that is oriented other than normal to a line from the identifying means to the plane.

It is also an object of this invention to provide an apparatus for use in determining the relative location of a vehicle with respect to a target, including a light source and a camera mounted on the vehicle, said target including at least three reflector elements, each selected to form an image of the light source, and all the images together forming a plane oriented other than normal to a line from the light source to the target; means for recording those images on the image plane of said camera due to ambient light; means for thereafter flashing the light source; means for comparing said images due to ambient light stored in said recording means and the images resulting both from ambient light and from the light source; and means for recording those images on the image plane of said camera due only to reflections of said light source.

It is a further object of this invention to provide a method for gathering information for determining the relative location of a target with respect to a vehicle wherein the vehicle is provided with a light source and a camera, and wherein the target is provided with at least three reflector elements, each selected to form an image of the light source, and all the images together forming a plane oriented other than normal to a line from the light source to the target, the method comprising the steps of: (a) recording the images formed on the image plane of the camera due to ambient light; (b) flashing the light source; (c) comparing the images recorded in step (a) with the images resulting both from ambient light and from the light source thereby to isolate those reflections of the light source in the reflector elements; (d) recording those images of the reflections due to the light source; and, (e) identifying the position of each such reflection of the light source from the reflector elements on the image plane of the camera and with respect to each other.

These and other objects and advantages of the invention will be apparent from the following description, the accompanying drawings and the appended claims.

BRIEF DESCRIPTION OF THE DRAWINGS

FIG. 1 is a perspective view showing a rack capable of supporting a plurality of pallets, and an automatically guided vehicle carrying a light source and a camera for sensing the reflections of the light source in a reflector member attached to a selected pallet.

FIG. 2 is a perspective view showing the camera and light source located below and to the right of a line passing perpendicular to and through the center of the target or reflector member.

FIG. 3A is a view showing the reflections of the light source in the reflector elements. FIG. 3B is a view showing the reflections from the mirrors on the target as they appear on the image plane of the camera.

FIG. 6 is a plan view showing various locations of an automatically guided vehicle, such as a fork lift, with respect to a pallet.

FIGS. 7A–7D represent the reflections of the light source in the reflector elements at the various locations of the vehicle with respect to the pallet, as shown in FIG. 6.

FIGS. 8A–8D represents the images of the reflections shown in FIGS. 7A–7D as they appear on the image plane of the vehicle carried camera.

FIG. 9A shows the signals due to the images of the retroreflectors as a result of the first flash of the light source. FIG. 9B shows the signals resulting from ambient light. FIG. 9C shows the signals when the light source is flashed a second time. FIG. 9D represents the electrical signals that remain after processing.

FIG. 10 is a vector diagram illustrating the directional relationship between a first image point P and the final image point P'. The illustrated vector is located at the nodal point of the sensor lens.

FIG. 11 is a block diagram of the video processing circuit used to identify and locate images of the retroreflectors and other reflector elements.

FIGS. 12A–12C are timing diagrams showing the various signals that occur during various times during the operation of this invention.

DESCRIPTION OF THE PREFERRED EMBODIMENT

Figure 5:
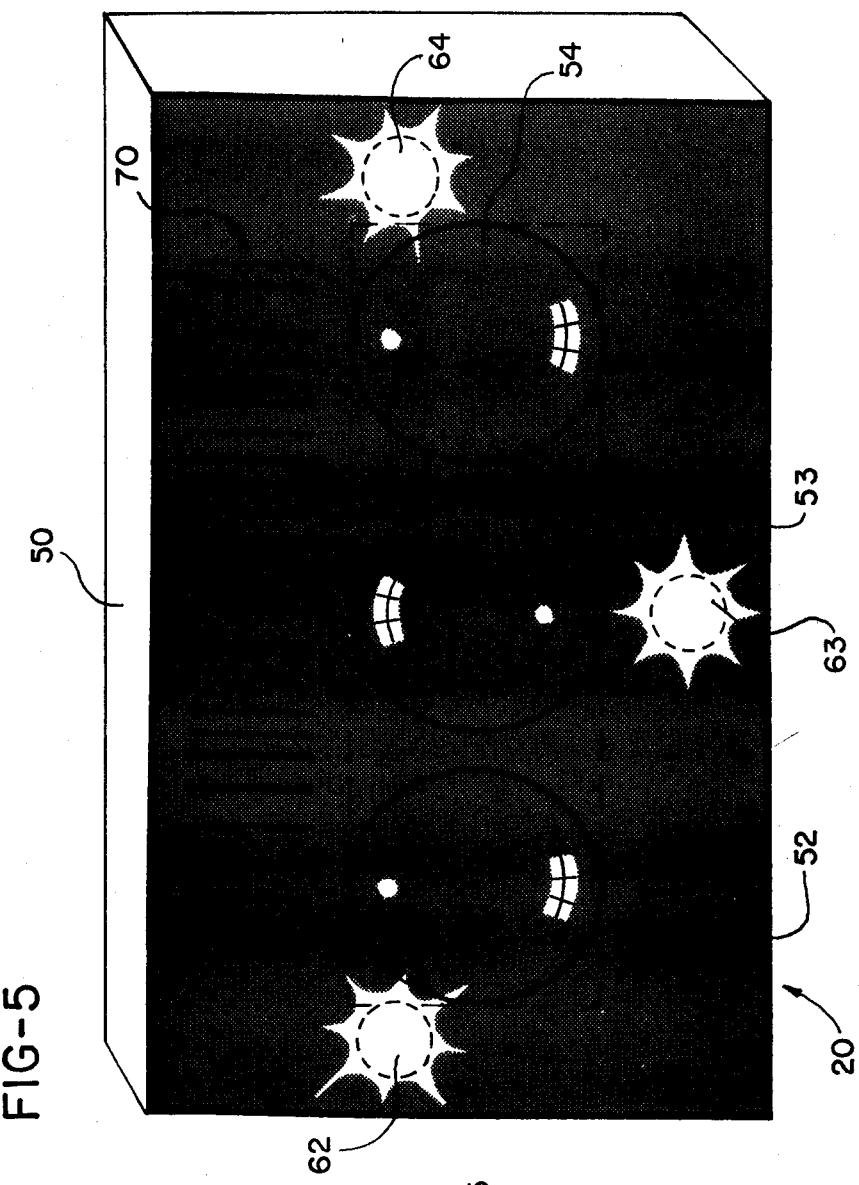
FIG. 5 illustrates a target or reflector member with attached retroreflector members, spherical reflector elements, and a bar code.

Referring now to the drawings which illustrate a preferred embodiment of this invention, and particularly to FIG. 1, a pallet storage rack 10 is shown supporting a pallet 15. The pallet is provided with a target member 20.

A wooden pallet 15 is shown, and the target member 20 is illustrated as being a separate component attached to the pallet. It should be understood, however, that any type of pallet structure may be used, and the target member 20 may either be a separate unit or it may be formed integral with the pallet itself.

Figure 4:
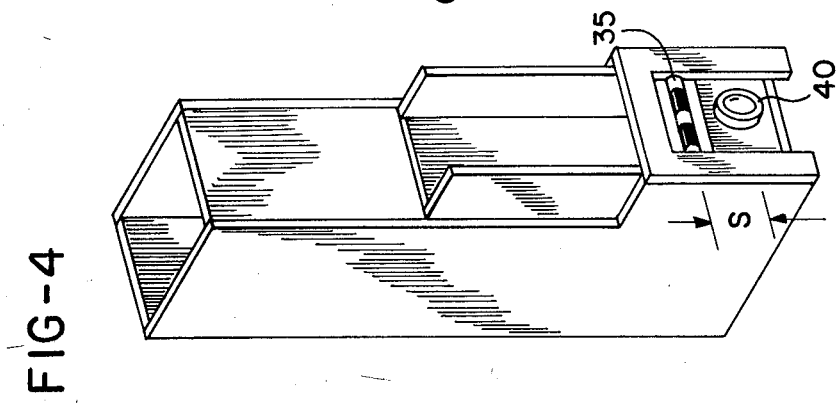
FIG. 4 is a perspective view showing the camera and light source mounted on the forklift vehicle.

A vehicle 30, such as a forklift truck, carries the identification means 35 (FIGS. 2 and 4), such as a high intensity light source, and an imaging sensing means 40, which is preferably a miniature TV camera, such as a Sony XC-37 CCD camera. The light source and camera are preferably mounted together as a unit 45, with the light source 35 immediately adjacent and above the camera lens (FIG. 4). In the preferred embodiment, the vertical distance separating the light source and camera lens is approximately one inch.

The target member 20 is shown in more detail in FIG. 5, and it includes a generally flat support member 50, three reflector elements 52, 53, and 54, and three retroreflector members 62, 63, and 64. A bar code 70 for uniquely identifying the pallet may also be printed on or attached to the support member.

The light source and camera unit 45 is preferably aligned with the direction of travel of the vehicle. It is possible, however, to rotatably mount the camera on the vehicle so that it may scan through a large field of view, both horizontally and vertically. If this were done, however, the camera would be associated with a drive unit and position indicating device so that the proper corrections would be considered when calculating the relative location of the target.

The preferred embodiment of the invention, as illustrated, employs two convex reflector elements 52 and 54, and one concave reflector element 53. Each of the reflector elements is spherical in shape, and all are horizontally arranged on the support member 50. Both reflectors elements 52 and 54 have the same radius of curvature, and the radii of curvatures of all of the elements and their diameters are selected to provide a reasonable field of view A (FIG. 6) such that a reflection of the identifying means 35 will be viewable by the camera as long as the vehicle is within the field of view. In the embodiment described, it is preferred to have a minimum field of view of ±10° from the mirror platen normal. Typical mirrors may be approximately 1.5 inches in diameter and have a radius of curvature of 3 inches or greater. Mirrors 52 and 54 may be type 380 convex mirrors, and mirror 53 may be type 100 concave mirror, both manufactured by ROLYN.

It should be emphasized that the identifying means 35, while preferably a brilliant light source, could also be any means that could be detected by sensing means 40. A brilliant xenon flash lamp has been found effective for this purpose.

Referring to FIG. 2, the light/camera unit 45 is shown positioned below and to the right of the center line 60 passing through the target 20, but within the field of view A. Under these conditions, the reflection of the identifying means or light source 35 appear as images $P_A$, $P_O$, $P_B$ in mirrors 52, 53 and 54, respectively, as shown in FIG. 3. Since the mirrors are curved surfaces in the embodiment shown, the images $P_A$ and $P_B$ will appear toward the lower right portion of mirrors 52 and 54 and, the image $P_O$ will be toward the upper left in mirror 53.

Since the unit 45 is also facing essentially parallel to the center line 60, the images $P_A'$, $P_O'$, $P_B'$ of the identifying means would be grouped on the image plane 70 of the camera towards its upper left hand corner, as shown in FIG. 3B. (It will be assumed for the following illustration that the images formed on the image plane are not inverted or reversed.)

The absolute location of the reflections, the spacing between the reflections, and the relative position of all the reflections will provide information sufficient to determine from a single observation the location of the vehicle with respect to the pallet and the orientation or rotation of the pallat. As the location of the vehicle changes, the observed position of the identifying means or reflections on the image plane of the camera will also change, as will be explained.

It will be noted in FIG. 2 that the images $P_A$, $P_O$ and $P_B$ of the identifying means 35 in the reflector elements 52-54 will define a plane 80, and these images will also define a circle 82. In this invention, the plane 80 is not normal or perpendicular to the center line 60 of the target 20; it is in fact essentially parallel to the upper surface of the pallet. Further, the circle 82 will not include the lens of the camera 40. These conditions are necessary if the reflections are to provide an unambiguous result when they are analyzed to determine the location of the vehicle relative to the target.

Referring now to FIGS. 9A through 9D, these figures represent the images appearing on the image plane of the camera 40 during one sequence of operations necessary to gather positional information.

The preferred method of this invention provides for flashing the light source 35 and recording the positions of the reflections from the retroreflector members 62, 63 and 64. The circuit for accomplishing this is shown in FIG. 11. These reflections are identified in FIG. 9A as reflections 162, 163 and 164, respectively. These reflections are easily identified because they each occupy a plurality of pixels on the image plane 70 of the camera since they are physically large components of the target 20 and since the retroreflectors return a large percentage of the light emitted by the identifying means 35 back toward the source. For this reason, the effective sensitivity of the camera is reduced at this stage of the operation so that only the reflections of the retroreflectors are likely to be found at the image plane. Also, because of the high intensity of the reflected light, there may be some blooming of the image. The positions of each of the retroreflector images is recorded in memory means.

A calculation is performed by reference to the positions of the retroreflector images 162-164, and an area 200 is defined in which the reflections from the reflector elements 52-54 are likely to be found. This defined area 200 may be located anywhere on the image plane of the camera and will vary in area in proportion to the separation of the vehicle from the target. In other words, the closer the vehicle is to the target, the more widely separated will be the images, and the defined area will consequently be larger.

Figure 9A:
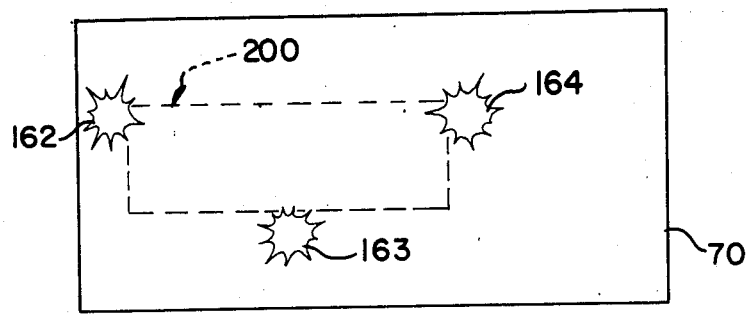
FIGS. 9A–9D represent the optical signals on the image plane of the sensor at a single location of the vehicle.
Figure 9B:
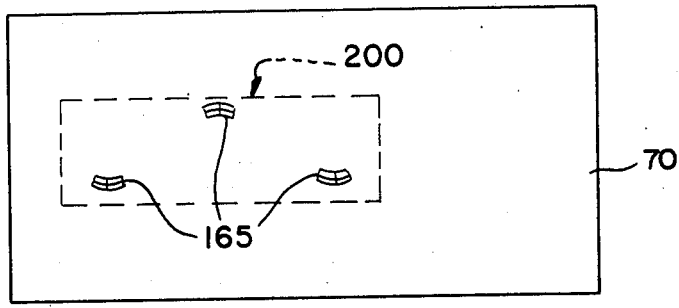

Once the area 200 has been defined on the image plane, the effective sensitivity of the camera is increased, and all of the images within the defined area are recorded in a recording means (FIG. 9B). These images are those resulting from ambient light and may include such reflections 165 as overhead lights, specular reflections from metal objects within the field of view, and other light sources.

Figure 9C:
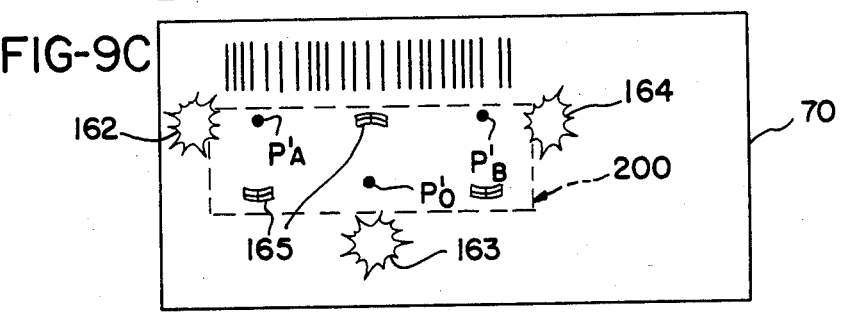

The next step is to reduce the effective sensitivity of the camera and again flash the light source 35. As shown in FIG. 9C, this time the image plane will contain the image of the retroreflectors 162-164, the ambient reflections 165, and also reflections $P_A$, $P_O$ and $P_B$ of the light souce in each of the reflector elements 52-54. All of the images within the defined area 200 are recorded.

Figure 9D:
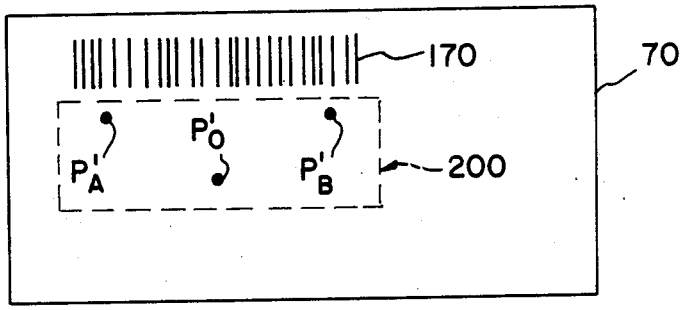

Any images from the retroreflectors that bloom into the defined area are removed from memory, and the images recorded in FIG. 9B are effectively subtracted from those in FIG. 9C, and what remains are images $P_A'$, $P_O'$ and $P_B'$, reflections of the light source in the reflector elements 52-54, as shown in FIG. 9D.

The center of each of these images $P_A'$, $P_O'$ and $P_B'$ are calculated and the video signals from the camera image plane are evaluated in accordance with the procedure later defined.

As shown in FIG. 5, the retroreflector members 62-64 surround the reflector elements 52-54. It should be apparent, however, that this physical arrangement is not absolutely necessary. The position of each retroreflector should be known so that an area in which the reflector elements are positioned can be defined.

Also, the position of the retroreflector elements further define a second area 210 in which the image 170 of the bar code 70 may be found, and at some appropriate time during the analysis of the image, the bar code may be read to confirm that the proper target is being approached.

It should also be apparent to those skilled in the art that the reflector elements 52-54 do not all have to be spherical in shape. All that is necessary is that the images of the identifying means carried by the vehicle be viewable by the camera. This means that one or more of the reflector elements could be a retroreflector. Using spherical mirrors, however, reduces the cost of the target and also provides relatively smaller images, images whose position can therefore be determined with a high degree of accuracy.

It is assumed in this description that the mirrors are evenly spaced and are horizontally aligned, and that the center line of the target, that is, the center mirror, is the desired final position of the light/camera unit 45. It should be recognized, however, that any orientation of the mirrors and any position of the camera unit with respect to the target would be acceptable and would not depart from this invention. All that the control circuit would need is information regarding the final desired position of each of the reflections on the image plane. Because of convention, and for purposes of explanation, it will be assumed that the desired final position will be on the center line with the images equally spaced on the image plane and that the images are in a horizontal line. The area between the retroreflectors is provided with a dark background in order to minimize random noise and false data.

Referring now to FIGS. 6, 7A-7D and 8A-8D, it is assumed that the light/camera unit 45 is in the same horizontal plane as the target, and the vehicle 30 is positioned to the right of the center line 60 in location 1. The reflections of the light source are shown in FIG. 7A, and the images of the reflections on the image plane 70 of the camera 40 are shown in FIG. 8A and would be located in the left center of the image plane. The images are close together and unequally spaced. The location of the images on the image plane and their relative spacing are all important to the calculations for determining the vehicle's relative location with respect to the target.

Assuming the vehicle moves to location 2 in FIG. 6, the images of the reflections on the image plane will move apart (due to the closer proximity to the target) and they will also move toward the right side of the image plane 70, as shown in FIG. 8B (due to the change in the direction of the vehicle).

When the vehicle arrives at location 3, it will be seen in FIG. 8C that the image of the reflections on the image plane move toward the center and each reflection moves away from each other reflection. In this case, the center reflection is still closer to the left hand reflection because the vehicle is still not located on the center line of the target.

Finally, when the vehicle reaches location 4 in FIG. 6, the reflections of the light source will be centered in the mirrors, as shown in FIG. 7D, and the images on the image plane will be in the position shown in FIG. 8D.

Referring now to the block diagram of FIG. 11, both the light source 35 and the camera 40 are connected to electronic control and processing circuits 300. At the heart of this circuit is a microprocessor system 310 which provides control signals, instructions and controls the flow of data to the remainder of the circuit. A timing logic circuit, shown generally at 320, responds to instructions from the microprocessor system 310 to control the light source or flash 35, the video information from the camera 40, and the way that information is processed and stored in the remainder of the circuit.

A random access memory or video RAM circuit 330 provides the means for recording the images on the image plane of the video camera 40.

A multiplexer 340, operating under control of the microprocessor 310 and timing logic circuit 320, transfers video information into the video RAM 330 through a serial-to-parallel converter 350, and out of the video RAM 330 through a parallel-to-serial converter 360.

A digital-to-analog (D/A) converter 370 responds to a digital signal from the microprocessor to establish a threshold level for the output of the video camera unit, and that threshold level determines what video information passes from the camera 40 through a comparator circuit 380 into a selection circuit 390, which circuit includes a first AND gate 392, a second AND gate 394, and an exclusive OR gate 396.

Referring now to the timing diagram of FIG. 12A, a typical output of the camera unit 40 on the RS170A video line 301 is illustrated. In this diagram, each interval between vertical blanking pulses 302 represents one-half frame. For example, the interval designated 401 includes all of the odd numbered lines of one frame or screen, while the interval 402 represents all of the even numbered lines. The intervals 401 and 402 together comprise one complete frame.

A power up signal is provided by the microprocessor system on line 316 to the timing logic 320 when the system is first turned on to synchronize the microprocessor system with the timing logic circuit. In turn, the timing logic circuit sends a reset pulse on line 321 to the video camera unit to initialize this device.

The camera 40 provides a video output signal to the comparator circuit 380, and part of this output is a pulse 302 representing the vertical blanking interval. During each vertical blanking interval, the timing logic circuit provides a vertical sync pulse back to the microprocessor on line 324.

The microprocessor system 310, operating under a software program, controls the sequencing of operation of the entire system. In normal operation, the microprocessor establishes an initial threshold level for the camera by sending a digital value on the microprocessor bus 315 to the D/A converter 370. This threshold level, shown in FIG. 12A, as the dashed line 372, limits those signals that may pass through the comparator circuit 380. This initial level is set high enough that all reflections, except from the retroreflectors, within the field of view of the camera will be ignored and will not be passed on to the selection circuit 390.

Next, the microprocessor 310 sends a flash enable signal 311 on line 312 to timing logic circuit 320. This signal extends through the vertical blanking interval 302. At the beginning of the vertical blanking interval, the microprocessor generates a strobe signal on line 313, and the timing logic circuit 320 in response thereto sends a flash trigger pulse 322 on line 323 at the beginning of interval 401 to the light source or strobe 35.

As previously explained, the light source 35 is a high intensity xenon strobe which floods the area in front of the camera with a short duration pulse of high intensity light. The threshold level 372 during intervals 401 and 402 is set high enough that only the video signals exceeding the predetermined threshold value, such as those representing the reflections 162–164 returned by the retroreflectors 62–64, will be allowed to pass through the comparator 380. Although the duration of the flash may be measured in microseconds, the light energy of the reflections therefrom will be retained on the camera image plane for one complete frame.

Figure 12C:
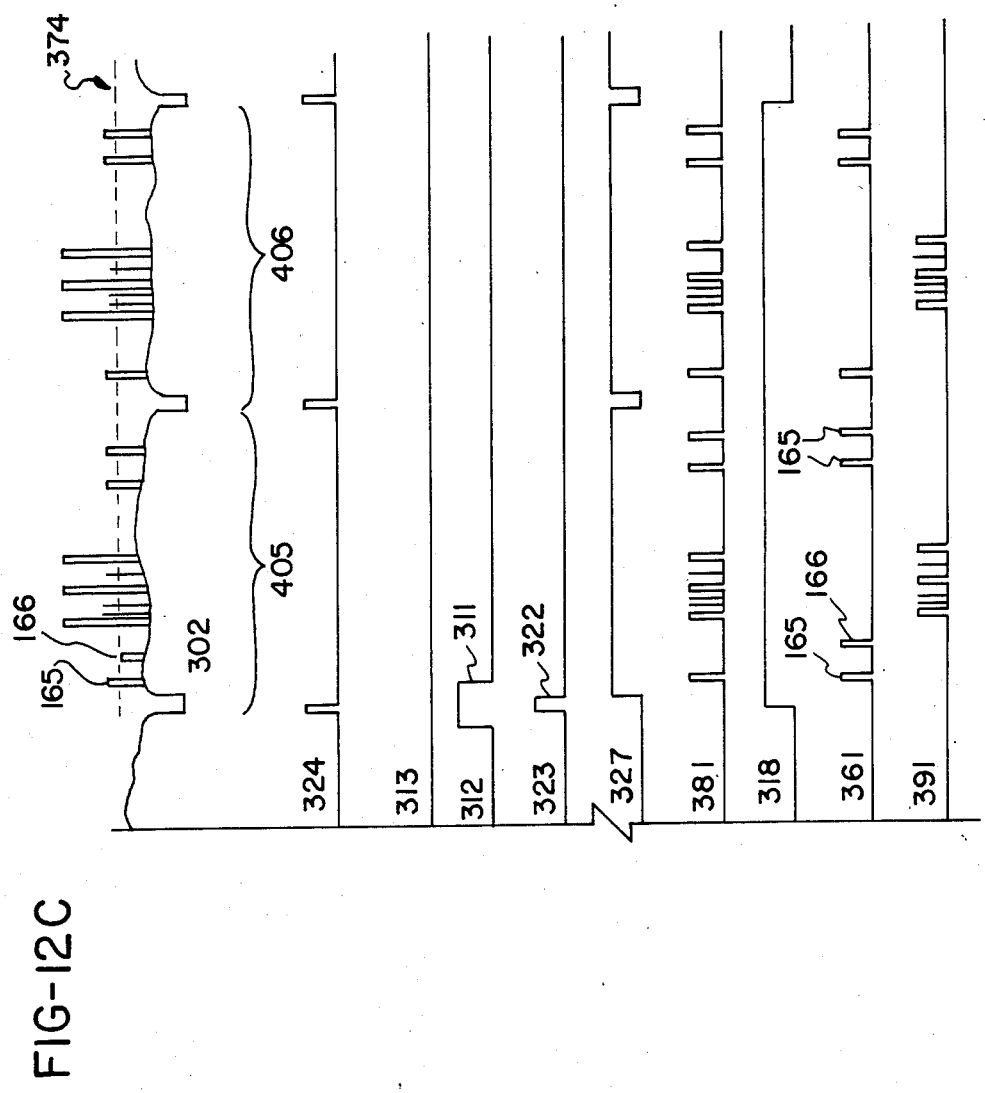

The video camera unit 40 provides an output on line 326 from the internal camera clock, basically a 3.58 MHz series of pulses, to the timing logic circuit 320. These clock pulses are converted by the timing logic circuit into pixel clock pulses on line 327, with each pixel clock pulse representing a single pixel as it appears on the camera image plane. As shown in FIGS. 12A–12C, pixel clock pulses are provided to the serial-to-parallel converter 350 and the parallel-to-serial converter 360 for two intervals after a start pulse.

The camera, a Sony XC-37 CCD Camera, has an image plane providing an array of 384×491 pixels. Half of those pixels will be interrogated during the first interval and the other half during the second interval. Thus, each pixel on the camera image plane is separately and uniquely identified and it can be determined whether or not the output from each pixel exceeds the predetermined threshold level.

The output of the comparator 380 is applied on line 381 to selection circuit 390, and to both the AND gate 392 and exclusive OR gate 396. During intervals 401 and 402, the exclusive OR enable line 318 is low and therefore the video information from the comparator 380 will be passed directly on line 391 into the serial-to-parallel converter 350.

Since the target 20 typically includes three retroreflectors in the preferred embodiment, it is expected that only three intense returns, or images 162, 163 and 164, will exceed the threshold 372, and therefore these images will be processed through the serial-to-parallel converter 350 and sent on the video RAM data bus 355, through the multiplexer 340 under control of signals provided by timing circuit 320 on bus 328, and into the video RAM 330 via bus 335 where they will be stored or recorded in electronic form.

In a preferred embodiment of this invention, because the images of the retroreflectors are so large, it is possible to speed up the process by scaling the pixel clock and limiting the video data stored in the RAM 330 by storing every fourth pixel of every fourth line of each frame and still detect the presence of the retroreflectors.

These stored or recorded images of the retroreflectors are scanned by the microprocessor under software control so that their locations may be determined, and subsequent scanning or interrogation of the video RAM may then be limited to the area bounded by the retroreflectors thereby to speed up the identification and location of the images of the light source in the reflector elements.

Referring now to FIG. 12B, the threshold level is set by the microprocessor to that shown at 373 so that low level images 165 and 166, which exceed the threshold level during intervals 403 and 404, may pass through the comparator 380. The selection circuit 390 remains inactive at this time, so those images will be recorded in the video RAM 330 in accordance with the process described above. Thus, the images on the image plane of the camera due to ambient light are temporarily recorded for later reference.

FIG. 12C illustrates the next step in the process. The microprocessor 310 increases the threshold level slightly to that shown at 374. This will permit most of the images due to ambient light to pass through the comparator 380, but will eliminate some that might have been marginal, such as image 166. This will also tend to eliminate noise from the camera itself and slight changes in size of the image due to camera movement.

The flash is once again enabled and it is triggered a second time at the beginning of interval 405. This time, those signals representing images from ambient light 165, the images of the retroreflectors 162-164, and also the images $P_o$, $P_A$ and $P_B$ of the light source in the reflector elements will be passed by the comparator 380 into the selection circuit 390. An exclusive OR enable signal on line 318 from the microprocessor 310 will now be present, however, and the selection circuit 390 will now be active and will prevent those signals representing ambient light images from being passed through to the video RAM 330.

The selection circuit 390 provides the means for comparing the images due to ambient light temporarily stored in the recording means or memory 330 and the images resulting from both ambient light and from the light source, and for thereafter recording only those images due to reflections of the light source in the video RAM 330.

When the signal level on the exclusive OR enable line 318 is raised (FIG. 12C at the beginning of frame 405), AND gate 394 is enabled, the data previously recorded during intervals 403 and 404 (FIG. 12B) will be taken from the video RAM 330 through the multiplexer 340 into the parallel-to-serial converter 360 via bus 345, the output of which on line 361 is applied a pixel at a time as the other input to the AND gate 394. The parallel-to-serial converter 360 receives a latch signal on line 329 from the timing circuit to enable the converter 360 to accept a block of data from the video RAM and then to read that data out to the selection circuit 90 under direction of the pixel clock signal on line 327. Thus, for each pixel that contains information relating to ambient light, there will be an output from AND gate 394 to the exclusive OR gate 396.

All video signals on line 381 are applied both to AND gate 392 and to exclusive OR gate 396. Any such signal that does not have a counterpart in the video RAM, and thus an output on line 361, will be allowed to pass through AND gate 392 and thereafter be stored in the video RAM 330, replacing any information previously stored therein. On the other hand, any signal (image) which previously appeared in the video RAM does not have a counterpart on line 381 will be ignored. Thus, an image, such as represented by 166, which appeared and was allowed to pass into the video RAM during frames 403 and 404, but not during frames 405 and 406 because the threshold level had been increased slightly, will be ignored.

At the end of frame 404 therefore, only those images appearing on the image plane of the camera which are due to reflections of the light source in both the retroreflectors and the reflector elements will be recorded in video RAM 330.

Since the location of the retroreflector images is known and was determined during intervals 401 and 402, the location of the reflections of the light source in the reflector elements with respect to each other and with respect to the image plane of the camera can now be accurately determined by analyzing the data stored in RAM 330 and the location of the vehicle in relation to the target calculated.

The technique for calculating the relative positions of the vehicle and target will now be discussed.

One of the target points, the center one, $P_o$, is chosen as a target reference point or origin.

The other two points, $P_A$ and $P_B$, have 3-dimensional vector offsets from $P_o$. These offset vectors are identified as a and b in the target coordinate system.

TARGET POINTS AS VIEWED BY SENSOR

Consider an axis system fixed with respect to the camera. The specific axis system chosen is the right-handed system shown in FIG. 2, with x representing horizontal, positive to the right; y representing horizontal, positive along forward lens axis; and z representing vertical, positive up. The first nodal point of lens, i.e., the center of the lens of camera 40 for idealized "thin" lens is considered the origin.

In this system, the target reference point $P_o$ will be at some vector location, R.

If the pallet is not rotated, then points $P_A$ and $P_B$ would be at vector locations R+a and R+b, respectively. In general, however, there will be some rotation, i.e., a and b will be rotated. There are, therefore, these forms for vectors in the two axis systems:

| Target Point Label | Vector Locations in Pallet Axes | Vector Locations in Sensor Axes |
|---|---|---|
| $P_o$ | (origin) | R |
| $P_A$ | a | R + α |
| $P_B$ | b | R + β | where α and β are related to the original vectors by a rotation matrix M:

$a = Ma$ $\beta = Mb$

In short, the image points will correspond to three points which, from the viewpoint of the sensor, are at locations R, R+α, R+β. The vectors R, α and β, and the rotation matrix M, are initially unknown.

DIRECTION VECTORS, u, v, w

In general, the direction of any single source or target point can be established with a camera system, but not distance. The direction can be defined by a vector from image point to lens center (thin lens) or second nodal point (thick lens). See FIG. 9.

For the target points, let the direction vectors corresponding to $P_O$, $P_A$, and $P_B$ be called u, v, w, respectively. These vectors could be chosen as unit vectors (generally convenient for analysis). A more convenient and natural normalization is to scale these vectors so that the lens-axis or y-component equals focal length. The x and z components are then simply the horizontal ($\xi$) and vertical ($\eta$) components of location in the focal plane. (With due regard for signs and "image reversal.")

BASELINE VECTOR EQUATIONS

In terms of known direction vectors u, v, w, the basic vector equations become $$R = \lambda_O u \quad (1)$$

$$R + \alpha = \lambda_A v \quad (2)$$

$$R + \beta = \lambda_B w \quad (3)$$

where $\lambda_O$, $\lambda_A$, $\lambda_B$ are (unknown) scalars proportional to distance.

Equations (1) through (3) are underdetermined. There are 12 unknowns (three components each for R, α, β vectors, plus the three scalar λ's), and nine scalar equations. The "missing" three equations come from scalar invariance relationships.

SCALAR INVARIANCE RELATIONSHIPS: THREE SCALAR EQUATIONS

Although α and β are unknown as vectors, partial information comes from scalar invariants of (rigid-body) rotation. Specifically, if α=Ma; β=Mb, M=rotation matrix,
then $$\alpha \cdot \alpha = \alpha^2 = a^2 \text{ (known)} \quad (4)$$

$$\beta \cdot \beta = \beta^2 = b^2 \text{ (known)} \quad (5)$$

$$\alpha \cdot \beta = a \cdot b \text{ (known)} \quad (6)$$

These equations correspond to the physical properties that rotation does not change vector lengths, and for rigid-body rotation the angle subtended by any two vectors remains unchanged.

ALGORITHM OVERVIEW: REQUIREMENTS, PHILOSOPHY, PROBLEMS

Equations (1) through (6) collectively form a fully determined baseline equation set. They give 12 nonlinear (scalar) equations in 12 (scalar) unknowns, if evaluation of unknown rotation matrix M is temporarily regarded as a "later step."

The algorithmic steps are based upon mathematical analysis that successively reduces the dimensionality of the problem. The ultimate step becomes that of solving a single nonlinear equation in one unknown, after which the reduction steps are retracted to give explicit values of the other variables. At the end of the retrace, R, α, and β are known.

A separate procedure is then developed to establish, from computed α and β and preset a and b vectors, the rotation matrix M. From M, the evaluation of "standard" rotation angles—pitch, roll, and yaw—is then straightforward. Evaluation of explicit pitch, roll, and yaw is convenient for sensitivity studies and design analysis. For the operational system, these angles may not be explicitly required.

Although the obvious goal of algorithmic development is to achieve some method of solving the large set of simultaneous nonlinear equations, there is not necessarily uniqueness in the approach. To the extent possible, the exact approach chosen and documented here was aimed at (a) minimizing sensitivity to effects of computer roundoff errors and (b) providing for efficient, that is fast, computation.

There are two distinct solutions to a given problem. An algorithm requirement, therefore, is the capability to evaluate both solutions and to select the one that is "correct." Problems of "correctness" are addressed later.

The sequence of steps to reduce the baseline equations, leading to evaluation of the primary vectors R, α, and β will now be described.

EQUATIONS (1) THROUGH (3): CHANGE IN λ PARAMETERS

In Equations (1), (2), and (3), this change of variables for the λ's:

$\lambda_O$: (no change)

$\lambda_A = \lambda_O(1+\epsilon)$ $\lambda_B = \lambda_O(1+\delta)$ gives revised forms $$R = \lambda_O u \quad (1')$$

$$R + \alpha = \lambda_O(1+\epsilon)v \quad (2')$$

$$R + \beta = \lambda_O(1+\delta)w. \quad (3')$$

This form allows separation of variables as discussed below, and also eventually allows isolation of "small" from "large" quantities.

ELIMINATION OF R

Equation (1') can be substituted into Equations (2') and (3') to give two equations for α and β with $\lambda_O$ as a parameter:

$$\alpha/\lambda_O = (1+\epsilon)v - u = (v-u) + \epsilon v \quad (7)$$

$$\beta/\lambda_O = (1+\delta)w - u = (w-u) + \delta w \quad (8)$$

These equations are characterized by two forms of isolation of "large" from "small" variables. First, the R vector, which is generally large relative to the α and β vectors, has been eliminated. Second, the parameter $\lambda_O$, which is generally large relative to the $\epsilon$, $\delta$ parameters, has been partially isolated. This isolation will become complete in the next two steps.

REDUCTION OF THREE SCALAR EQUATIONS

The vector Equations (7) and (8) can be converted to three scalar equations with vector dot-product forms proportional to $\alpha^2$, $\beta^2$, $\alpha\cdot\beta$:

$$\alpha^2/\lambda_o^2 = (v-u)^2 + 2\epsilon v\cdot(v-u) + \epsilon^2\cdot v^2 \quad (9)$$

$$\beta^2/\lambda_o^2 = (w-u)^2 + 2\delta w\cdot(w-u) + \delta^2\cdot w^2 \quad (10)$$

$$\frac{\alpha\cdot\beta}{\lambda_o^2} = \quad (11)$$

$$(v-u)\cdot(w-u) + \epsilon v\cdot(w-u) + \delta w\cdot(v-u) + \epsilon\delta v\cdot w$$

Note that $\alpha^2$, $\beta^2$, and $\alpha\cdot\beta$ are known (Equations 4, 5 and 6). Also, all of the vector dot products on the right-hand sides of these equations are constants that depend only upon known u, v, w vectors.

These equations, therefore, have the form $$\alpha^2/\lambda_o^2 = A_1 + A_2\epsilon + A_3\epsilon^2 \quad (9')$$

$$\beta^2/\lambda_o^2 = B_1 + B_2\delta + B_3\delta^2 \quad (10')$$

$$\alpha\cdot\beta/\lambda_o^2 = C_1 + C_2[\epsilon + C_3\delta^2 + C_4\epsilon\delta, \quad (11')$$

with $\alpha^2$, $\beta^2$, $\alpha\cdot\beta$, $A_1$, ... $C_4$ as known constants, and with three scalar unknowns $\lambda_o$, $\epsilon$ and $\delta$.

ELIMINATION OF $\lambda_o$: REDUCTION TO TWO SCALAR EQUATIONS

A consequence of the change from $(\lambda_o, \lambda_A, \lambda_B)$ to $(\lambda_o, \epsilon, \delta)$ is the way in which $\lambda_o$ is isolated in Equations (9) through (11). Elimination of $\lambda_o$ is now a trivial algebraic step, giving two equations in scalars $\epsilon$ and $\delta$ only. The obvious forms are $$\beta^2[A_1 + A_2\epsilon + A_3\epsilon^2] = \alpha^2[B_1 + B_2\delta + B_3\delta^2]$$

$$(\alpha\cdot\beta)\cdot[A_1 + A_2\epsilon + A_3\epsilon^2] = \alpha^2[C_1 + C_2\epsilon + C_3\delta + C_4\epsilon\delta].$$

These are simply two 2-dimensional polynomials in $\epsilon$ and $\delta$, expressible in form $$D_1 + D_2\epsilon + D_3\epsilon^2 + D_4\delta + D_5\delta^2 = 0 \quad (12)$$

$$E_1 + E_2\epsilon + E_3\epsilon^2 + E_4\delta + E_5\epsilon\delta = 0 \quad (13)$$

where D and E coefficients are combinations of (previous) known constants.

REDUCTION TO EQUATION IN ONE VARIABLE, $\epsilon$

Equations (12) and (13) are near the end of the reduction process. They could be solved simultaneously, using (for example) a 2-dimensional version of Newton successive approximation. That approach is not preferred, largely because of practical problems in determining two distinct solutions (a requirement previously referred to), and because convergence would probably be slower than for alternatives discussed below.

Equations (12) and (13) could also be combined to give a purely 1-dimensional equation in $\epsilon$—a fourth-order polynomial equation of form $$P_1 + P_2\epsilon + P_3\epsilon^2 + P_4\epsilon^3 + P_5\epsilon^4 = 0 \quad (14)$$

This approach is analytically attractive. In its final form, the polynomial computations would be simple and easily adapted to finding multiple solutions. Convergence would generally be fast relative to a 2-variable approach.

The practical disadvantage of the Equation (14) approach is the complexity, lengthy software code and computation time involved in evaluating the P coefficients prior to solving for roots.

The preferred approach is a 1-dimensional approach of a somewhat different form.

First, note that Equation (13) can be solved for $\delta$ as an explicit function of $\epsilon$:

$$\delta = g(\epsilon) = \frac{-(E_1 + E_2\epsilon + E_3\epsilon^2)}{E_4 + E_5\epsilon} \quad (15)$$

Equation (12) can then be written as if a function only of $\epsilon$:

$$f(\epsilon) = D_1 + D_2\epsilon + D_3\epsilon^2 + D_4\delta + D_5\delta^2 = 0 \quad (16)$$

with the understanding that $\delta$ is always evaluated (from Equation (15)) as a function of $\epsilon$.

An $\epsilon$-solution, therefore, is a value of $\epsilon$ for which Equation (16) holds. The corresponding $\epsilon$ is then given by Equation (15), once an $\epsilon$ solution is identified.

This approach, discussed below, has the convergence rate of the "pure" 1-dimensional approach (4th-order polynomial), but with a lesser amount of subsidiary computation.

FINAL EQUATIONS FOR $\epsilon$ AND $\delta$: GENERAL PROPERTIES AND PROBLEMS

The final approach involves finding the $\epsilon$ root, or roots, for $$f(\epsilon) = D_1 + D_2\epsilon + D_3\epsilon^2 + D_4\delta + D_5\delta^2 = 0 \quad (16, \text{repeated})$$

with $\delta$ as an explicit function of $\epsilon$:

$$\delta = \frac{-(E_1 + E_2\epsilon + E_3\epsilon^2)}{E_4 + E_5\epsilon}. \quad (15, \text{repeated})$$

For the class of problems and target-point geometries that occur in applications of the type described here, there are normally two distinct real roots to Equation (16), and two complex roots. Physical solutions correspond to the two real roots.

Of the two physical solutions, one is "usually" identifiable as not valid. For some of the retroreflector target-point geometries (vs. mirror configurations), and in presence of mosaic quantization and/or other sources of errors, resolution of correct

THE "SECOND ROOT" PROBLEM

Consider a situation in which (a) a real root, $\epsilon_1$, has been evaluated for Equation (16), and (b) this root is judged to be the wrong root. For this case, the second root is established as the root of:

$$g(\epsilon) = 0 \quad (17)$$

$$g(\epsilon) = \frac{f(\epsilon)}{\epsilon - \epsilon_1} \text{ if } \epsilon \neq \epsilon_1 \quad (17a)$$

$$= f'(\epsilon_1) \text{ if } \epsilon = \epsilon_1 \quad (17b)$$

Equation (17b) is the limiting form of (17a) as $\epsilon$ approaches $\epsilon_1$.

This formulation is equivalent to dividing out an $(\epsilon - \epsilon_1)$ factor from a pure polynomial form.

The pair of equations (15 and 16) yield double roots for $\epsilon$ and $\delta$. Procedures for establishing both $\epsilon$ and $\delta$ pairs and selecting the physically valid values are required. versus incorrect solution is not necessarily reliable. This problem is strictly a data error problem, not an algorithmic problem. Empirical studies indicate that this type of problem does not occur for the mirror configuration and realistic distance/angle combinations.

A potential problem exists with Equation (15), in that for some value of $\epsilon$ (say, $\epsilon_o$) a zero denominator occurs. Theoretically (i.e., in absence of roundoff errors), this case must imply that the numerator is also zero and that a definite (finite) limiting value exists.

In software implementation, this zero/zero problem is explicity treated only for the following special case analytically established as physically possible:

$$\epsilon_o = 0$$

$$E_1 = E_4 = 0$$

For this case, Equation (15) is replaced with $$\delta = \delta(\epsilon) = \frac{E_2 + E_3\epsilon}{E_5} \quad \text{(15, special form)}$$

No instances of zero-denominator problems have occurred in several thousands of software execution of the algorithms. That fact does not, of course, guarantee that such a problem will never occur. Of course, additional protective code could be added. Without such code, however: (a) the likelihood of a problem is small, and (b) at worst, an abort of a pallet load or unload operation would occur.

THE RETRACE STEP

A series of steps of variable elimination, leading eventually to the evaluation of the $\epsilon$ and $\delta$ parameters, has been described. Retracing is the process of then working backwards, with known $\epsilon$ and $\delta$, to get the three required baseline vectors: R, $\alpha$ and $\beta$.

RETRACE TO $\gamma_o$. The $\gamma_o$ parameter is a required intermediate variable. It is obtained from Equation (9'), rewritten in the explicit form $$\lambda_o = \sqrt{\frac{A_1 + A_2\epsilon + A_3\epsilon^2}{\alpha^2}} \quad (18)$$

It could also be evaluated from Equation (10'), or (provided $\alpha \cdot \beta \neq 0$) from Equation (11'), since $\epsilon$ and $\delta$ have, in principle, been evaluated to make these three equations compatible.

RETRACE FOR R, $\alpha$, AND $\beta$

With $\epsilon$, $\delta$, and $\lambda_o$ established, then:

$$R = \lambda_o u \quad (19)$$

$$\alpha = \lambda_o[v - u + \epsilon v] \quad (20)$$

$$\beta = \lambda_o[w - u + \delta w] \quad (21)$$

The steps for determining rotation matrix and the pitch, roll, yaw angles will now be described.

THE ROTATION PROBLEM: THE M MATRIX

Once $\alpha$ and $\beta$ are evaluated, a new algorithmic problem arises in solving for the unknown rotation matrix M that satisfies $$\alpha = Ma \quad (22)$$

$$\beta = Mb. \quad (23)$$

M is a $3 \times 3$ matrix, hence with nine elements. These nine elements are not independent, however. The constraint that M be a rotation matrix implies that only three degrees of freedom exist. These three degrees of freedom can be identified with pitch, roll, and yaw angles, but that identification is neither required nor useful in the steps to solve for M.

MATRIX FORMULATION NO. 1 TO GIVE M

The two Equations (22) and (23) can be supplemented with a third linearly independent equation, that must be true for a rigid body rotation:

$$\alpha \otimes \beta = M(a \otimes b) \quad (24)$$

where $\otimes$ means vector cross product.

Now write the separate Equations (22) through (24) as a single matrix equation $$\begin{pmatrix} | & | & | \\ \alpha & \beta & \alpha \otimes \beta \\ | & | & | \end{pmatrix} = M \begin{pmatrix} | & | & | \\ a & b & a \otimes b \\ | & | & | \end{pmatrix} \quad (25)$$

$$Q = MP \quad (25')$$

where, for example, P has vector a as its first column, vector b as second column, etc.

The matrix P is nonsingular (provided only that the pallet vectors a and b are not collinear), so an immediate formal solution results:

$$M = QP^{-1}$$

In this form, solution would require computation of the inverse of $3 \times 3$ P matrix, followed by a matrix-times-matrix product.

MATRIX FORMULATION NO. 2 TO GIVE M

The actually implemented algorithm for calculation of the M matrix avoids the computational effort of matrix inversion. The concept is to use not the $\alpha$ and $\beta$ vectors (and $\alpha \otimes \beta$) directly, but to use equally valid combinations that are orthonormal. For a matrix with orthonormal columns, inversion is not explicitly required—the inverse is simply the transpose.

Three base vectors $\hat{\alpha}$, $\hat{\beta}$, and $\hat{\gamma}$ will be chosen by combining and normalizing the $\alpha$ and $\beta$ vectors. Exactly the same (hence compatible) combinations and normalization will be applied for the a, b vectors, giving $\hat{a}$, $\hat{b}$, $\hat{c}$. Vectors $\hat{\alpha}$, $\hat{\beta}$, and $\hat{\gamma}$ will form an orthonormal set (orthogonal unit vectors); $\hat{a}$, $\hat{b}$, $\hat{c}$ will also form an orthonormal set; and the same M-matrix rotation property will hold. A form analogous to Equation (25) is then $$\begin{pmatrix} | & | & | \\ \hat{\alpha} & \hat{\beta} & \hat{\gamma} \\ | & | & | \end{pmatrix} = M \begin{pmatrix} | & | & | \\ \hat{a} & \hat{b} & \hat{c} \\ | & | & | \end{pmatrix} \quad (27)$$

$$\hat{Q} = M\hat{P} \quad (27')$$

but with the distinction that the inverse of $\hat{P}$ is simply the transpose of $\hat{P}(=\hat{P}')$. Therefore $$M = \hat{Q}\hat{P}' \quad (28)$$

Algorithmic steps to get the orthonormal vectors are discussed below.

ESTABLISHING $\hat{\alpha}$, $\hat{a}$

The first vectors, $\hat{\alpha}$ and $\hat{a}$, are trivial:

$$\hat{\alpha} = \text{unit }(\alpha)$$

$$\hat{a} = \text{unit }(a) \quad (29)$$

where unit "( )" means normalized to unit length.

ESTABLISHING $\hat{\beta}$, $\hat{b}$

For $\hat{\beta}$, we want a vector orthogonal to $\hat{\alpha}$ (hence, orthogonal to $\alpha$), that retains the information in $\beta$. The simplest construct, and the one implemented, is to first form the linear combination $$\beta' = \beta - c\alpha \quad (30)$$

with the constant c chosen as $$c = (\alpha \cdot \beta)/\alpha^2. \quad (31)$$

Then $\beta'$ will be orthogonal to $\hat{\alpha}$ and $\alpha$. The second step is then simply to normalize $\beta'$ to a unit vector:

$$\hat{\beta} = \text{unit }(\beta') \quad (32)$$

For b, the same steps are followed using a and b:

$$b' = b - ca \quad (33)$$

$$\hat{b} = \text{unit }(b') \quad (34)$$

Note that $(a \cdot b)/a^2$ is the same as $(\alpha \cdot \beta)/\alpha^2$ from scalar invariance properties, so the "c" in Equation (30) is the same as in Equation (33).

ESTABLISHING $\hat{\gamma}$, $\hat{c}$

For $\hat{\gamma}$, a unit vector orthogonal to $\hat{\alpha}$ and $\hat{\beta}$ is given by the vector cross product $$\hat{\gamma} = \hat{\alpha} \times \hat{\beta} \quad (35)$$

Similarly, $$\hat{c} = \hat{a} \times \hat{b}. \quad (36)$$

Since these are (automatically) unit vectors, explicit numerical normalization steps are not required.

Equation (28) is the form used for software evaluation of M. It requires a matrix-times-matrix multiplication, no explicit matrix inversion.

PITCH, ROLL, AND YAW ANGLES FROM M

The matrix M can be considered to be the product of three canonic matrices associated with pure pitch, roll, and yaw. The convention chosen for the order of multiplication is $$M \cdot (\text{vector}) = PRY \cdot (\text{vector}), \quad (37)$$

i.e., the yaw matrix Y is first applied to the vector, then the roll matrix R, then the pitch matrix P.

The canonic matrices are $$Y = \begin{pmatrix} c_y & -s_y & 0 \\ s_y & c_y & 0 \\ 0 & 0 & 1 \end{pmatrix} \quad (38)$$

$$R = \begin{pmatrix} c_r & 0 & -s_r \\ 0 & 1 & 0 \\ s_r & 0 & c_r \end{pmatrix} \quad (39)$$

$$P = \begin{pmatrix} 1 & 0 & 0 \\ 0 & c_p & -s_p \\ 0 & s_p & c_p \end{pmatrix} \quad (40)$$

where $c_y = \cos$ (yaw angle), $s_y = \sin$ (yaw angle), $c_r = \cos$ (roll angle), etc., are used as abbreviations for trigonometric functions of angles. The product is then $$M = PRY = \begin{pmatrix} c_r c_y & -c_r s_y & -s_r \\ c_p s_y - s_p s_r c_y & c_p c_y + s_p s_r s_y & -s_p c_r \\ s_p s_y + c_p s_r c_y & s_p c_y - c_p s_r s_y & c_p c_r \end{pmatrix} \quad (41)$$

Given the values of the elements (Mij) of the M matrix, pitch, roll, and yaw angles are then evaluatable as inverse trigonometric functions:

$$\text{pitch angle} = \tan^{-1} \cdot \left( \frac{-M_{23}}{M_{33}} \right) \quad (42)$$

$$\text{roll angle} = \sin^1 (-M_{13}) \quad (43)$$

$$\text{yaw angle} = \tan^{-1} \left( \frac{-M_{12}}{M_{11}} \right) \quad (44)$$

While the method herein described and the form of apparatus for carrying this method into effect constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for use in determining the relative location of a vehicle with respect to a target, including:
   a light source and a camera mounted on the vehicle, said target including at least three reflector elements, each selected to form an image of the light source, and all the images together defining a plane oriented other than normal to a line from the light source to the target;
   means for recording those images due to ambient light formed on the image plane of said camera;
   means for thereafter flashing the light source;

means for comparing said images due to ambient light stored in said recording means and the images resulting both from ambient light and from the light source; and means for recording those images formed on the image plane of said camera due only to reflections of said light source.

2. The apparatus of claim 1 further including:

retroreflective members mounted on said target and in a predetermined relation to said reflector elements;

means for initially flashing the light source;

means for sensing the reflections of the light source from the retroreflector members as they appear on the image plane of the camera; and means responsive to the images of the retroreflectors for defining an area on the image plane of the camera where reflections from the reflector elements would be located.

3. A method for gathering information for determining the relative location of a target with respect to a vehicle wherein the vehicle is provided with a light source and a camera, and wherein the target is provided with at least three reflector elements, each selected to form an image of the light source, and all the images together defining a plane oriented other than normal to a line from the light source to the target, the method comprising the steps of:

(a) recording the images formed on the image plane of the camera due to ambient light;

(b) flashing the light source;

(c) comparing the images recorded in step (a) with the images resulting both from ambient light and from the light source thereby to isolate those reflections of the light source in the reflector elements;

(d) recording those images of the reflections due to the light source; and (e) identifying the position of each such reflection of the light source from the reflector elements both on the image plane of the camera and with respect to each other.

4. A method for gathering information for determining the relative location of a target with respect to a vehicle, and wherein the vehicle is provided with a light source and a camera wherein the target is provided with at least three reflector elements, each selected to form an image of the light source and all the images together defining a plane oriented other than normal to a line from the light source to the target, and retroreflective members in a predetermined relation to the reflector elements, the method comprising the steps of:

(a) flashing the light source;

(b) recording the positions of the reflections of the light source from the retroreflector members are viewed by the camera;

(c) defining an area within the image plane of the camera where reflections for the reflector elements would be located by reference to the location of the light reflected by the retroreflector members;

(d) recording the images from the target within the defined area due to ambient light;

(e) flashing the light source a second time;

(f) recording the images within the defined area resulting from both ambient light and from the light source;

(g) comparing the images from step (d) with those from step (f) to isolate those reflections from the light source; and (h) determining the position of each reflection of the light source from the reflector elements both on the image plane of the camera and with respect to each other.

5. The method of claim 4 wherein the images recorded in step (f) must be brighter than a predetermined level, and wherein the record of all reflections from the target from step (d) are compared with those reflections from the target recorded in step (f) that are brighter than the predetermined level in order to identify those reflections of the light source reflected only by the reflector elements.

* * * * *

UNITED STATES PATENT AND TRADEMARK OFFICE
CERTIFICATE OF CORRECTION

PATENT NO. : 4,678,329

DATED : July 7, 1987

INVENTOR(S) : Frank J. Lukowski, Jr. and Harry B. Hammill, III

It is certified that error appears in the above-identified patent and that said Letters Patent is hereby corrected as shown below:

Col. 5, line 18, "pallat" should read --pallet--.

Col. 10, line 10, "video RAM does" should read --video RAM that does--.

Col. 17, line 57, "$\hat{\gamma}=\hat{\alpha} \quad \hat{\beta}$" should read --$\hat{\gamma}=\hat{\alpha} \otimes \hat{\beta}$--; and line 61, "$\hat{c}=\hat{a} \quad \hat{b}$." should read --$\hat{c}=\hat{a} \otimes \hat{b}$.--.

Col. 20, claim 4, line 15, "are viewed" should read --as viewed--; and

Col. 20, claim 4, line 18, "for the reflector" should read --from the reflector--.

Signed and Sealed this

Eighth Day of December, 1987

Attest:

DONALD J. QUIGG

Attesting Officer

Commissioner of Patents and Trademarks